US008857604B2

(12) United States Patent
Heber et al.

(10) Patent No.: US 8,857,604 B2
(45) Date of Patent: Oct. 14, 2014

(54) CONVEYOR BELT TAKE-UP ASSEMBLY AND METHOD

(75) Inventors: Gerald J Heber, Bellevue, WA (US); Michael Wierman, Woodinville, WA (US)

(73) Assignee: Gea Refrigeration North America, Inc, York, PA (US)

( * ) Notice: Subject to any disclaimer, the term of this patent is extended or adjusted under 35 U.S.C. 154(b) by 0 days.

(21) Appl. No.: 13/437,838

(22) Filed: Apr. 2, 2012

(65) Prior Publication Data

US 2012/0247929 A1    Oct. 4, 2012

Related U.S. Application Data

(60) Provisional application No. 61/471,023, filed on Apr. 1, 2011.

(51) Int. Cl.
*B65G 43/00* (2006.01)
*B65G 43/02* (2006.01)
*B65G 21/18* (2006.01)

(52) U.S. Cl.
CPC ............. *B65G 21/18* (2013.01); *B65G 43/02* (2013.01)
USPC ................. 198/810.01; 198/810.04; 198/778

(58) Field of Classification Search
USPC ................. 198/818, 810.04, 810.03, 810.02, 198/810.01, 831, 837, 839; 271/197
See application file for complete search history.

(56) References Cited

U.S. PATENT DOCUMENTS 2,230,745 A    2/1941   Eiselstein
2,293,917 A *  8/1942   Perkins .............................. 15/60
2,345,415 A    3/1944   Nagy et al.
3,026,778 A *  3/1962   Fotsch et al. ................... 409/118
3,138,235 A    6/1964   Collette
3,537,276 A * 11/1970   Pityo ............................. 65/59.23
3,666,083 A    5/1972   Smith
3,938,651 A    2/1976   Alfred et al.
4,189,047 A    2/1980   Beckius (Continued)

FOREIGN PATENT DOCUMENTS

DE    102004051479    4/2006
EP         0655215    5/1995

OTHER PUBLICATIONS

Ryson International, Inc company blog, Feb. 4, 2011 http://ryson.com/blog/2011/02.

*Primary Examiner* — Ramya Burgess
*Assistant Examiner* — Lester Rushin
(74) *Attorney, Agent, or Firm* — Dean A. Craine (57) ABSTRACT

An improved take-up assembly used on spiral conveyor belt with interconnecting links. The take-up assembly is designed to prevent damage to the belt due to obstructions, excessive tension or excessive buckling. The take-up assembly includes a pivoting swing arm assembly coupled to an obstruction sensor that automatically shuts-off the drive motor used to move the conveyor belt when an obstruction is detected upstream from the take-up assembly. A second obstruction sensor can be used on the upper portion of the take-up assembly to detect obstructions. Also disclosed is a buckling arm located above and longitudinally aligned with the belt and pivotally attached to the distal end of the lower swing arm assembly. The swing arm is designed to pivot beyond the position where the first obstruction sensor is activated so that the amount of belt that continues to be drawn into the stack as the stack coasts to a stop.

17 Claims, 9 Drawing Sheets

(56) References Cited

U.S. PATENT DOCUMENTS

| | | |
|---|---|---|
| 4,421,228 A | 12/1983 | Marsiglio et al. |
| 4,462,523 A | 7/1984 | Kerr |
| 4,858,747 A | 8/1989 | Eunson |
| 7,117,989 B2 * | 10/2006 | Weigel et al. ............ 198/810.04 |
| 7,140,486 B2 * | 11/2006 | Kim .......................... 198/810.03 |
| 2010/0158652 A1 * | 6/2010 | Anderson et al. ............. 414/307 |

* cited by examiner

CONVEYOR BELT TAKE-UP ASSEMBLY AND METHOD

This utility patent application is based upon and claims the priority filing date of U.S. provisional patent application (Application No. 61/471,203) filed on Apr. 1, 2011.

BACKGROUND OF THE INVENTION

1. Field of the Invention

The invention disclosed herein pertains to self-stacking spiral conveyor belts commonly used in food processing plants, and more precisely to the take-up assemblies used with the self-stacking spiral conveyor belts.

2. Description of the Related Art

Long, spiral conveyor belts made up of a plurality of interconnected links are commonly used in food processing plants. Such belts typically include mechanisms that accommodate changes to the belt's length caused by the link's collapsing and expanding movement and normal wear.

More recently, take-up assemblies have been developed that are built into the frame work that supports the belt that enable sections of the belt to collapse and shorten the belt's overall length. The take up assemblies are located in a vertical pathway immediately upstream from an inside curve or bend.

Take-up assemblies typically include a rectangular frame longitudinally aligned over the straight, vertically aligned section of the conveyor belt's framework. The frame includes two, straight side frame members with two parallel, rigid diagonally aligned support arms that extend outward on opposite sides of the belt. Extending longitudinally from the end of the frame opposite the two diagonal support arms is a fixed curved assembly made up of two J-shaped arms located on opposite sides of the belt. Each J-shaped arm includes a straight leg segment and a curved segment. Attached to the tips of the curved segments and extending transversely over the belt is a lower cross-member.

When an obstruction occurs upstream from the take-up assembly, the belt extends its full pitch and the tension in the belt gradually increases. Damage to the belt and the framework can occur. When an obstruction is created downstream from the take-up assembly, the belt segment located above the take-assembly can buckle outward and press against the two diagonal support arms. As the segment of the belt moves through the vertical segment, gravity causes the links on the belt in the vertical segment to collapse and create a downward force on links immediately exiting the curve segment. If ice or food material becomes trapped or lodged in between the links, the links are not able to slide freely with an adjacent link which causes the belt to buckle upward.

The object of the invention disclosed herein to be prevent damage to the belt and the belt's framework and the supporting equipment caused by obstructions, increased belt tension, or buckling in the belt in or around the take-up assembly.

SUMMARY OF THE INVENTION

At the heart of this invention is the discovery that obstructions, excessive tension, and belt buckling can cause severe damage to spiral conveyor belts made of a plurality of interconnected links that naturally collapse and expand as the belt moves. Also at the heart of the invention is that by using a pivoting swing arm assembly in place of a fixed J-arm assembly and by using an obstruction sensor coupled to the pivoting swing arm assembly, obstructions and excessive belt tension, and belt buckling that can damage to the belt can be easily detected before damage is inflicted to the conveyor belt and the framework.

The invention disclosed herein is a take-up assembly for a spiral conveyor belt with a lower swing arm assembly and an obstruction sensor coupled thereto that automatically shuts off the drive motor used to move the conveyor belt when an obstruction is first detected upstream from the take-up assembly. The obstruction sensor, which acts as early detection sensor, is designed to allow normal collapsing and expansion movement of the belt in the take-up assembly. When excessive tension occurs or when buckling occurs downstream from the take-up assembly, the swing arm pivots and activates the obstruction sensor that automatically deactivates the belt's drive motor and discontinues movement of the belt. The swing arm is also designed to pivot beyond the position where the obstruction sensor is activated so that the amount of belt that continues to be drawn into the stack as the stack coasts to a stop does not cause excessive tension and damage.

An optional downstream obstruction sensor can also be used on the upper portion of the take-up assembly. Also, a downstream buckling sensor may be included that deactivates the belt's drive motor when the excessive buckling occurs in the belt.

DESCRIPTION OF THE PREFERRED EMBODIMENT(S)

Referring to the Figs. there is shown an improved take-up assembly 20 for a spiral conveyor belt 10 with a swing arm assembly mounted on its lower end and at least one of two obstruction sensing subsystems 80, 130 that automatically shut-off the drive motor 12 used to move the conveyor belt 10 when an obstruction is detected either upstream or downstream from the take-up assembly 20. The obstruction sensing subsystems 80, 130 are located on opposite ends of the take-up assembly 20 and designed to allow normal collapsing and expansion movement of the belt 10 in the take-up assembly 20. When excessive tension or buckling movement of the belt 10 occurs immediately downstream or upstream from the take-up assembly 20, one of the obstruction sensing subsystems sensors 80, 130 is activated that automatically deactivates the belt's drive motor 12 and discontinues movement of the belt 10.

Figure 1:
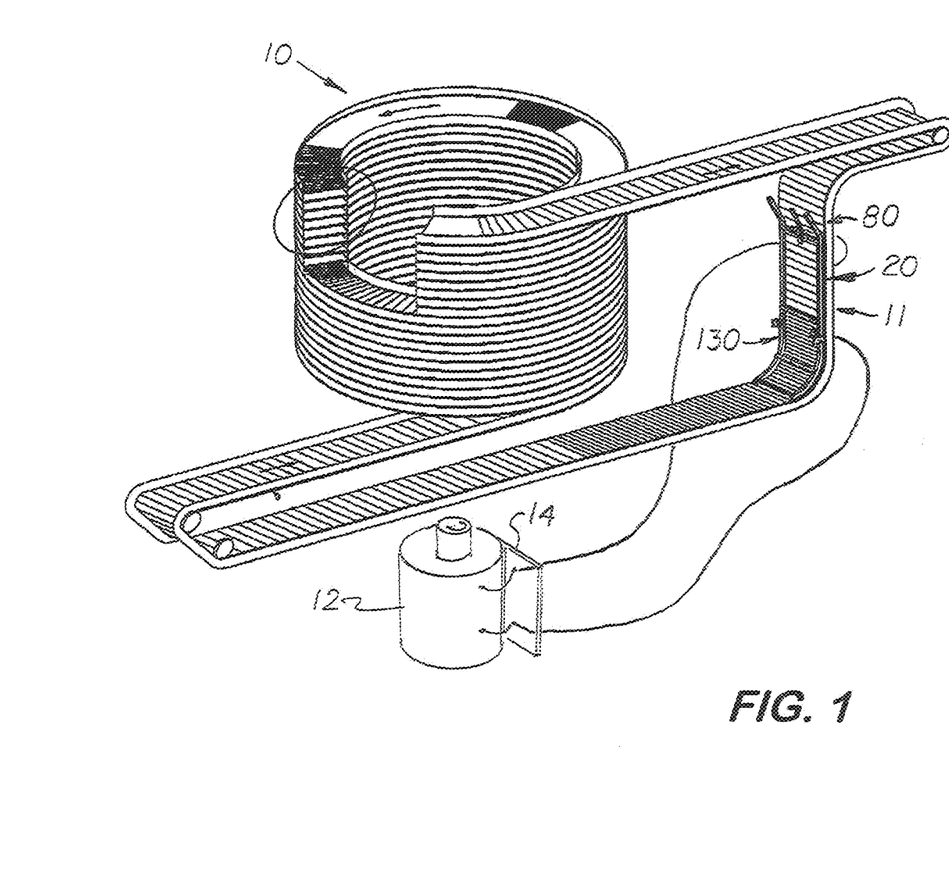
FIG. 1 is a overall view of a self stacking spiral conveyor belt with the improved take-up assembly mounted on the vertical segment of the belt.
Figure 2:
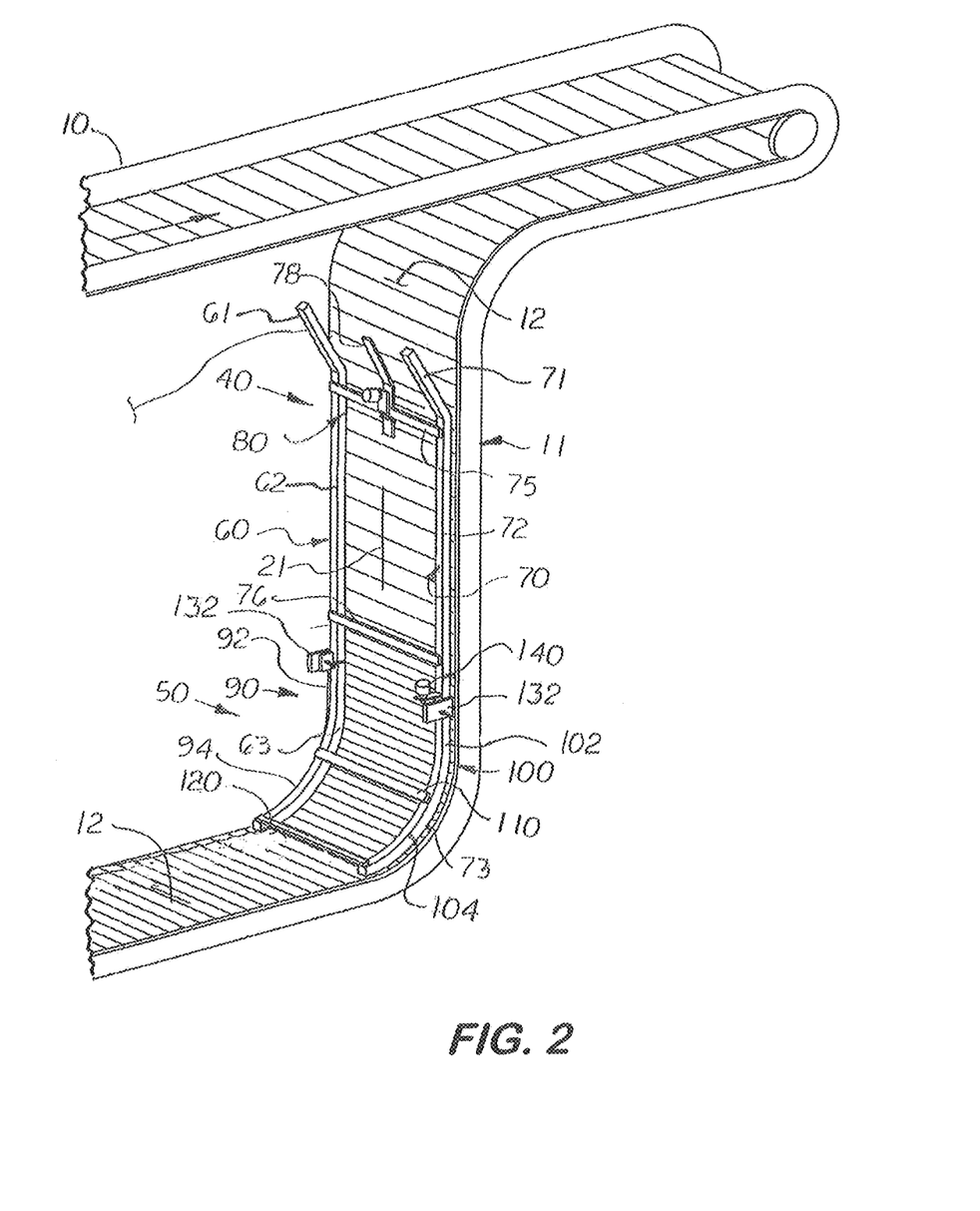
FIG. 2 is a detailed, perspective view of a portion of the self stacking spiral conveyor belt showing the improved take-up assembly mounted thereon.

As shown in FIG. 1, the take up assembly 20 is located on the vertical segment 11 of the belt's path. The belt 10 is supported by a frame 8 (partially shown in FIGS. 2-7) and is driven by at least one drive motor 12. The drive motor 12 may be electrically connected to a control panel 14. The take-up assembly 20 in the prior art, which is incorporated by reference herein, includes a pair of fixed conveyor belt guide rails 60, 70 that are longitudinally aligned with the conveyor belt 12 as it travels in the vertical segment 11. As shown in FIG. 2, each guide rail 60, 70 includes an attached to or integrally formed upper rigid upper diagonally supports arm 61, 71, respectively, and an intermediate straight segment 62, 72, respectively. Attached to the upper ends of the two straight segments 62, 72 and where the two support arms 61, 71 diverge, is an upper transverse member 75. Located near the lower ends of the straight segments 62, 72 is an intermediate transverse member 76.

Attached to the upper transverse member 75 is an outward extending trigger arm 78. In the embodiment shown, the trigger arm 78 is an angled rigid structure located between the two upper diagonal aligned straight segments 61, 71. The trigger arm 78 is disposed at 10 to 15 degrees from the vertical axis 21 and bends inward approximately 5 to 10 degrees and made parallel with the two support arms 61, 71 which are normally disposed at 20 to 40 degrees from the longitudinal, vertical axis 21.

In the take-up assemblies found in the prior art, a J-shaped arm assembly is fixed on the end of the take-up assembly. In the invention, the fixed J-shaped arm assembly is replaced by at least one pivotally attached J-shaped arm 90 or 100. In the embodiment shown in the Figs. the lower ends of the two straight segments 62, 72 are two J-shaped swing arms 90, 100 designed to rest over the conveyor belt. Each swing arm 90, 100 includes a straight segment 92, 102 and an integrally formed or attached curved segment 94, 104, respectively. The length of the straight segments 92, 102 and the curvature of the curve segments 94, 104, are sufficient so that the swing arms 90, 100 are positioned slightly above the belt 12 as it descends downward and through the lower portion of the vertical segment 11 and the bend. Attached over the mid axis and over the lower ends of the two swing arms 90, 100 are two optional transverse members 110, 120.

Figure 3:
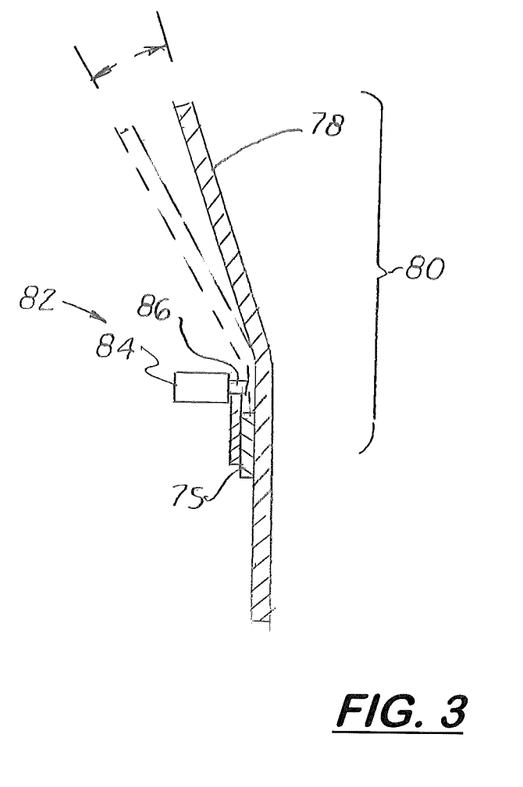
FIG. 3 is a sectional side elevational view of the first sensing subsystem 80 showing the movement of the trigger arm that presses against the plunger switch.
Figure 4:
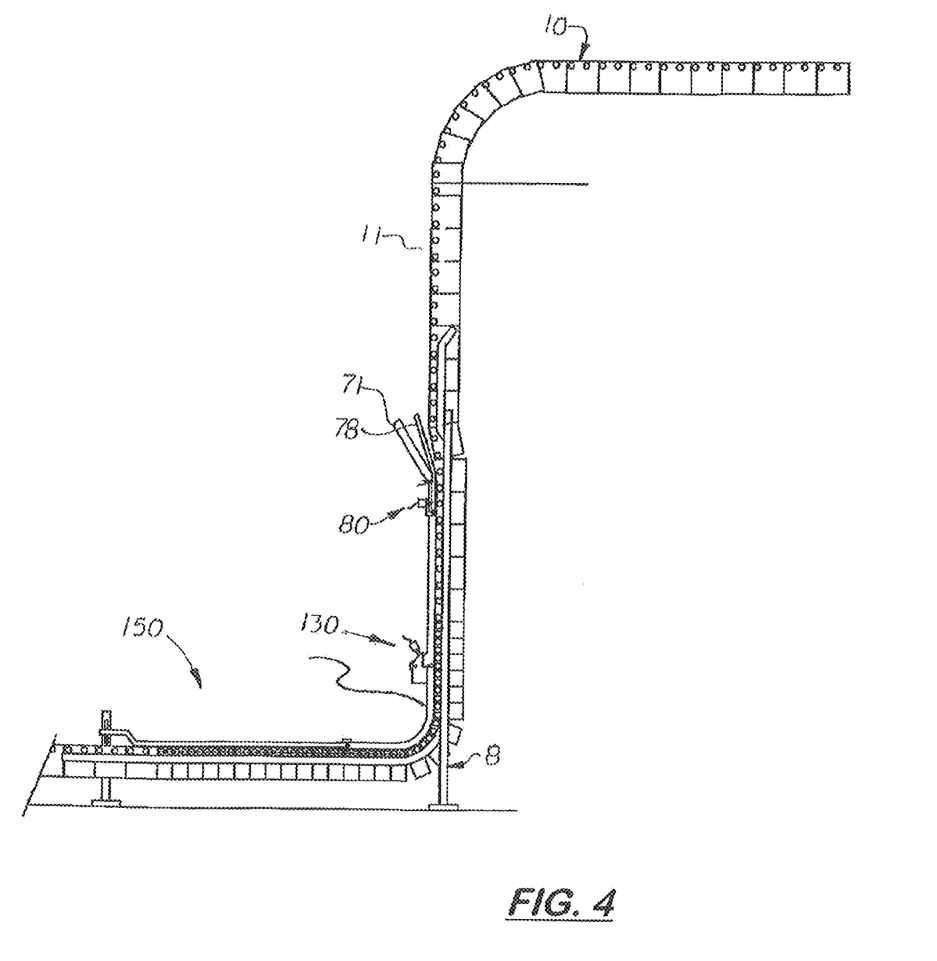
FIG. 4 is a side elevational view of a portion of the spiral conveyor belt and the improved take-up assembly shown in FIG. 2 showing the take-up assembly in a normal operating position.
Figure 5:
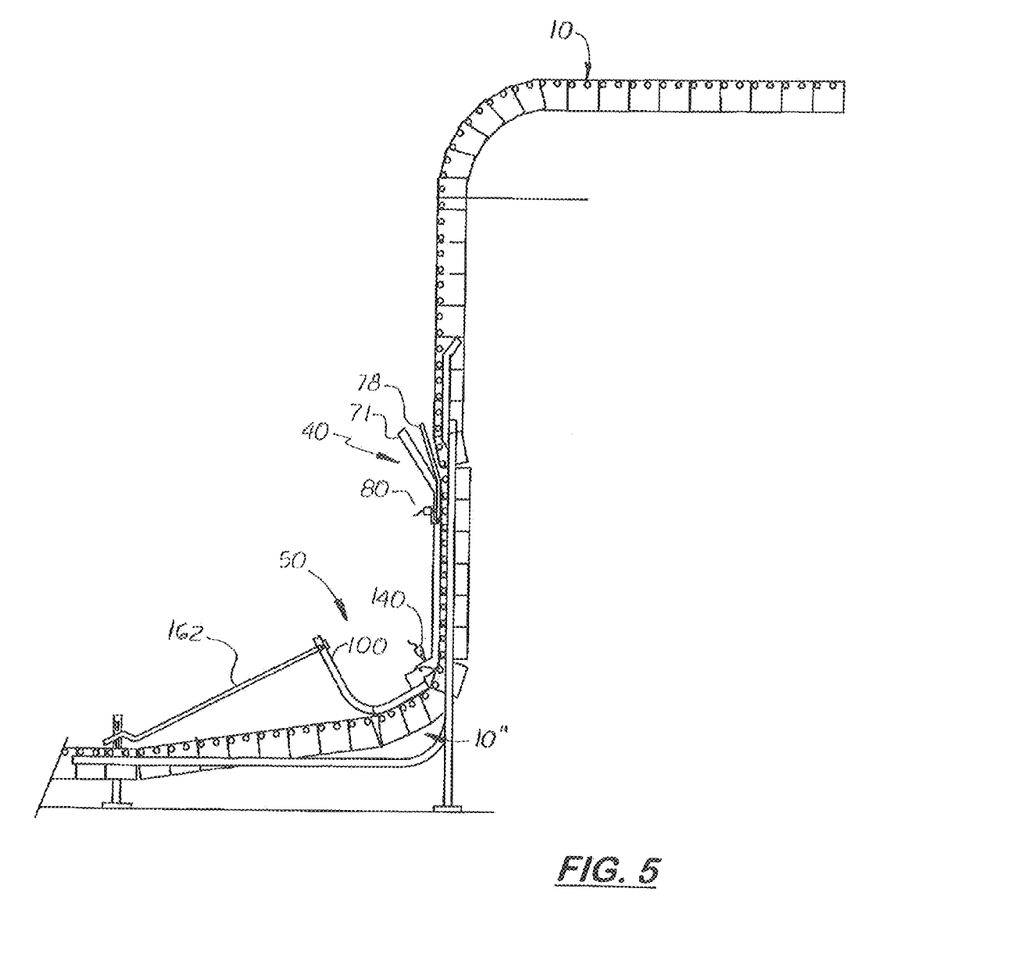
FIG. 5 is a side elevational view of the spiral conveyor belt and the improved take-up assembly shown in FIG. 2 showing the take-up assembly in a tripped position caused by an upstream obstruction.

The trigger arm 78 and the first tripping switch 82 make up the obstruction subsystem 80. The tripping switch 82 includes a plunger switch 84 attached to the upper transverse member 75. The plunger 86 extends towards the trigger arm 78 located adjacent to the plunger switch 82. When the belt 12 excessively bends outward, it presses against the trigger arm 78 which eventually presses against the plunger 86 as shown in FIG. 3. The tripping switch 80 is connected to the drive motor 12 or to the control panel 14. In the embodiment shown herein, the tripping switch 80 is a plunger switch 84 that includes a plunger 86 that when extended a sufficient distance is activated to transmits a signal (or deactivated to discontinue a signal depending how the switch is wired) to the drive motor 12 to deactivate the drive motor 12. It should be understood that other types of switches may be used to measure the amount of pressure exerted on or movement of the trigger arm 78.

Figure 7:
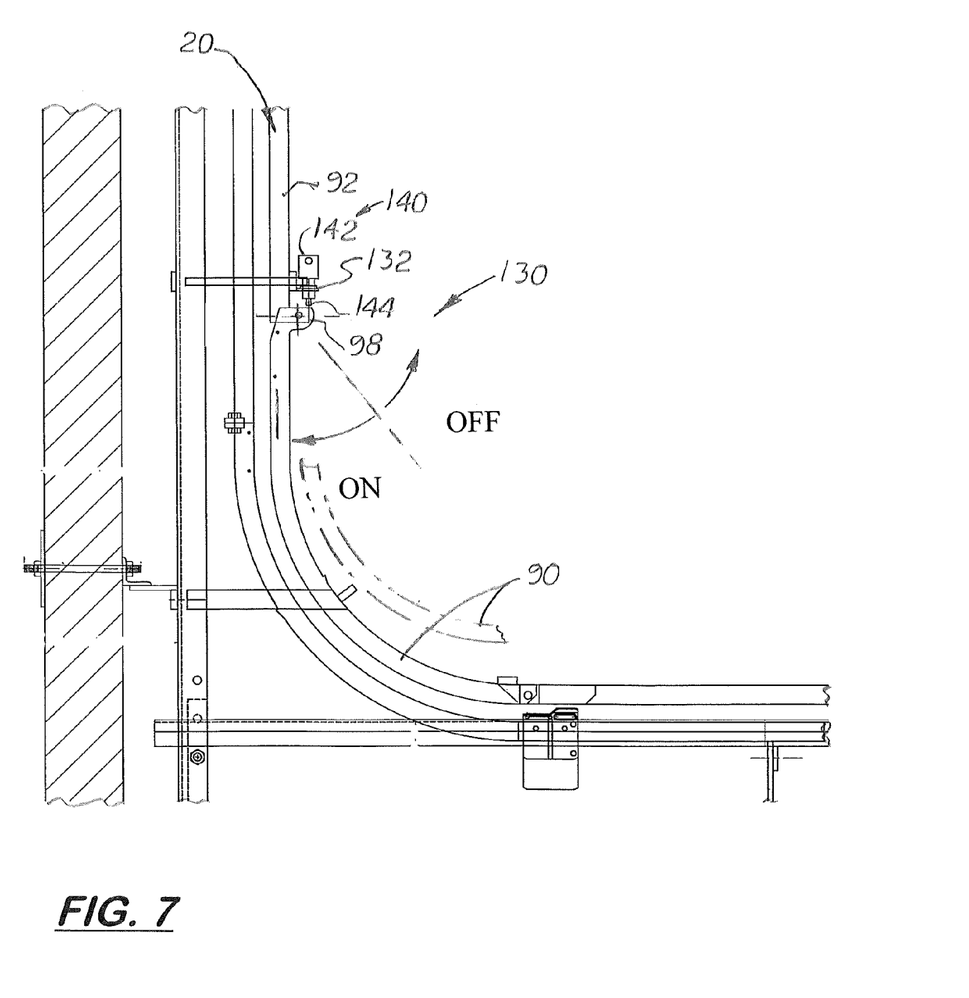
FIG. 7 is a partial, side elevational view of the improved take-up assembly showing the belt radius being reduced when under tension which causes the J-shaped arm to rotate and the cam head attached to its upper end of the J-shaped arm also being pressed against a plunger switch that eventually turns OFF the drive motor.

As mentioned above, the obstruction sensing subsystem 130 coupled to the swing arm assembly 50. The obstructing sensing subsystem 130 includes one or two support tabs 132 mounted on the lower ends of the straight segments 92, 102. Mounted on at least one of the switch support tabs 132 is a tripping switch 140 designed to activate when the conveyor belt 10 has sufficient excessive tension to rotate the two swing arms 90, 100 upwardly. FIG. 7 is a partial, side elevational view of a take-up assembly with the belt radius being reduced when under tension which causes the swing arm assembly 50 to rotate and the cam head 98 attached to its upper end of the J-shaped arm 90 or 100 also being rotated against a plunger switch 142 that eventually turns OFF the drive motor 12.

The tripping switch 140 is a plunger switch 142 that includes a plunger 144. Formed or mounted on the proximal end of each swing arm 90, 100 is a cam head 98, The cam head 98 is configured so that when the J-shaped arms 90, 100 are rotated outward as shown in FIG. 7, the plunger 144 is pressed inward which transmits a signal (or deactivated to discontinue a signal depending how the switch is wired) to the drive motor 12 to deactivate the drive motor 12. It is also important to note that by using a cam head 98 and a plunger switch 142, the J-shaped arms 90, 100 are able to continue to rotate beyond the tripping position so that swing arm assembly 50 may continue swing to accommodate increase tension in the belt as the belts comes to a stop. It should be also understood that other types of switches may used to measure the amount of pressure exerted on or movement of the swing arms 90, 100.

During assembly, the two plunger switches 82, 142 may be electrically connected to the drive motor 12 or to a control panel 14 which controls and powers a drive motor 12 that operates movement of the conveyor belt 10. When the trigger arm 78 or the two L-shaped swing arms 90, 100 are excessively deformed or rotated (approximately 5 to 30 degrees), one or both the plunger switches 82, 142, respectively, are activated that automatically discontinues the drive motor 12.

Figure 8:
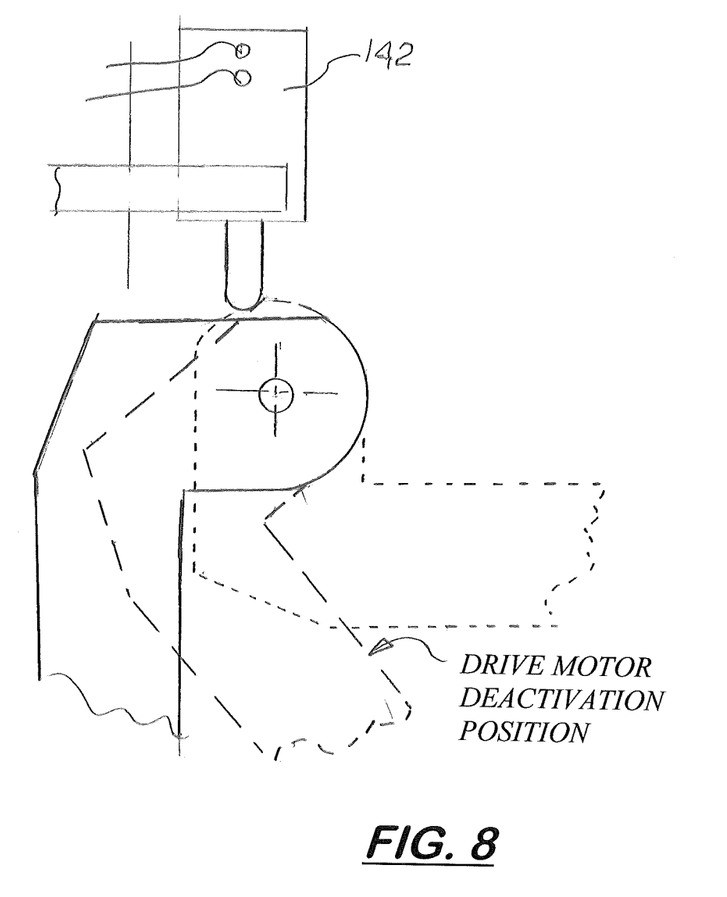
FIG. 8 is a partial side elevational view of the cam head on a J-shaped arm being rotated and showing the plunger on the plunger switch being forced upward and showing the J-shaped arm being rotated beyond the plunger.

FIG. 8 is a partial side elevational view of the cam head 98 on a pivoting J-shaped arm 90 being rotated and showing the plunger 144 on the plunger switch 142 being forced upward. Also shown is the J-shaped arm 90 being continuously rotated beyond the plunger activation position to allow the pivoting J-shape arm 90 to accommodate the belt's continuous momentum movement after the drive motor 12 has been deactivated.

It should be understood that in a second embodiment of the invention, the trigger arm 78 and the plunger switch 82 are eliminated so that only the obstruction subsystem 130 coupled with the pivoting J-shaped arms is used to deactivate the drive motor 12 and stop movement of the conveyor belt 10.

Figure 9:
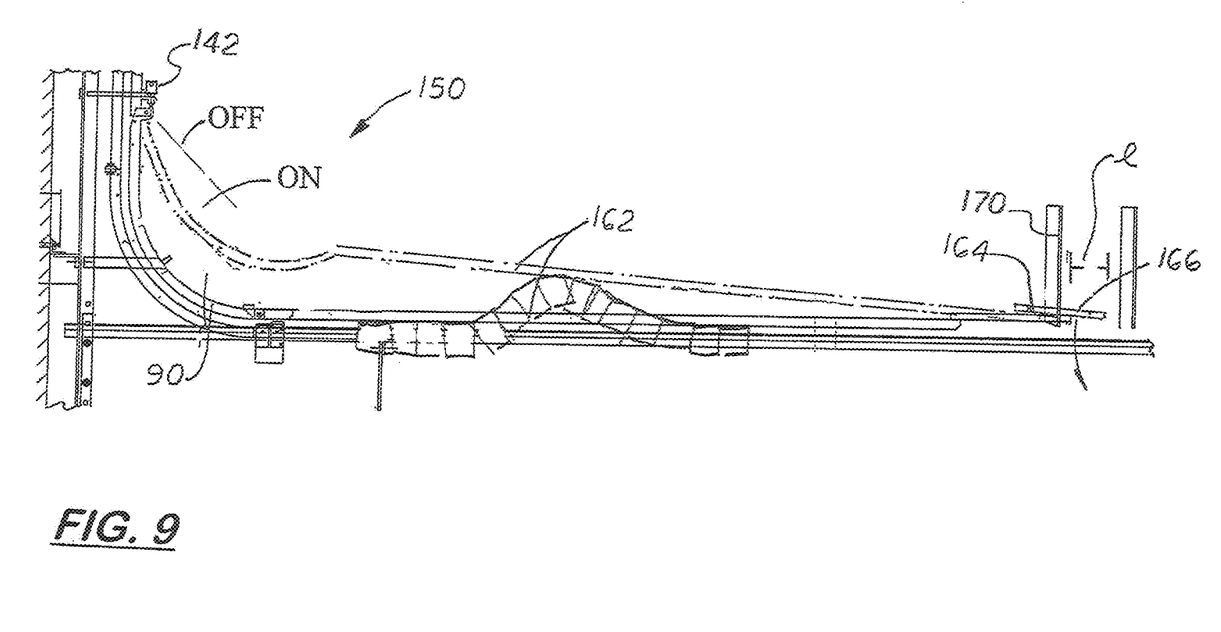
FIG. 9 is a side elevational view showing the belt buckling upward in the curved segment which causes the J-shaped arm with a buckling alignment arm attached to its distal end to be lifted and slide forward and the cam head being eventually rotated to an OFF position to deactivate the drive motor.

As mentioned above, the segment of the belt 12 moves through the vertical segment 11, gravity causes the links on the belt 12 in the vertical segment 11 to collapse and create a downward force on links immediately existing the curve segment. If ice or food material becomes trapped or lodged in between the links, the links are not able to slide freely with an adjacent link which causes the belt 12 to buckle upward which can cause a buckle as shown in FIG. 9. To automatically discontinue movement of the belt 12 when excessive buckling is occurring, an optional buckling sensing system 150 may be provided.

Figure 6:
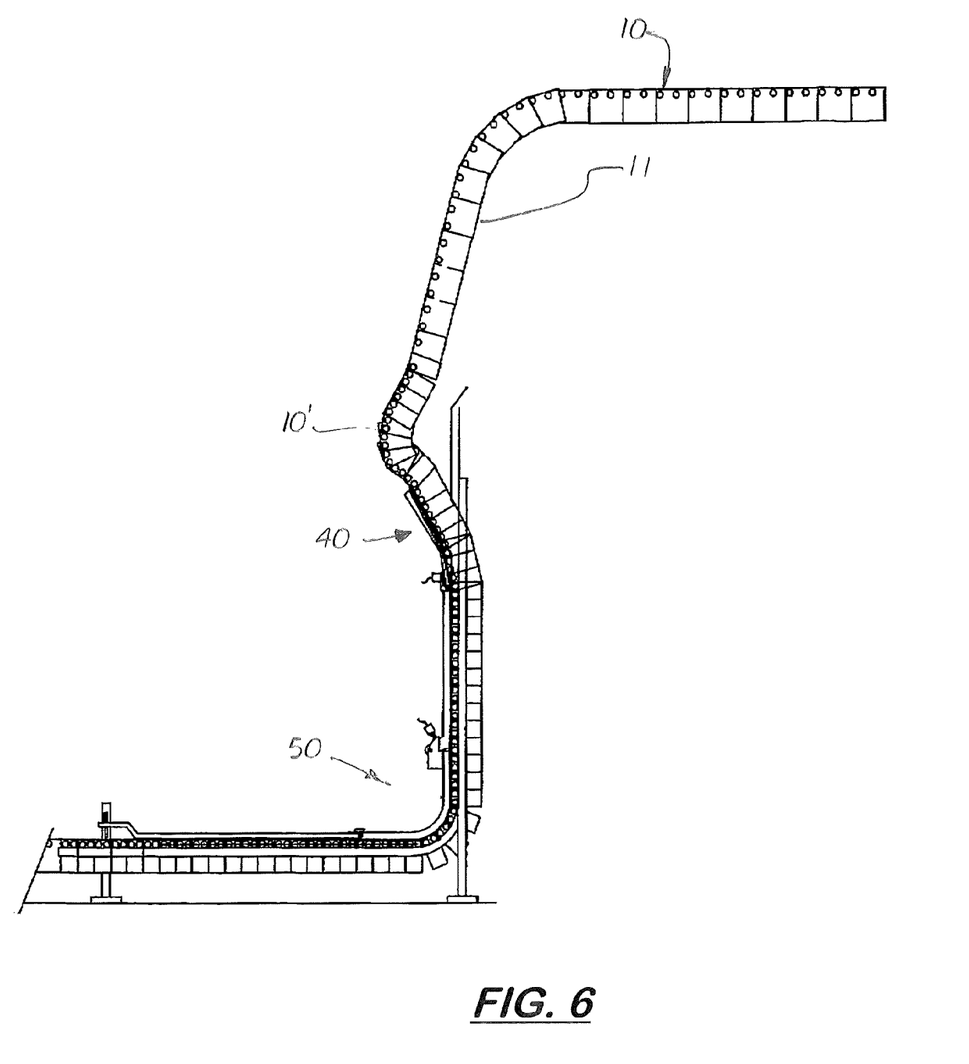
FIG. 6 is a side elevational view of the spiral conveyor belt and the improved take-up assembly shown in FIG. 2 showing the take-up assembly in a tripped position caused by an downstream obstruction.

As shown in FIGS. 6 and 9, the bucking sensing system 150 includes a straight belt buckling alignment arm 162 pivotally attached to the distal end of one of a swing arm 90. In the embodiment show herein, the alignment arm 162 is extended over the belt 12 so that the any buckling in the region of the belt 12 adjacent to the alignment arm 162, will force the swing arm 90 upward. When the swing arm 90 is rotated a sufficient distance, the second plunger switch 142 is moved to deactivate the drive motor 12. The distal end 164 of the alignment arm 162 goes through an elongated slot 166 in the vertical member 170 attached to the framework so that the alignment arm 162 is longitudinally aligned over the belt. When the swing arm 90 is rotated, the proximal end of the alignment arm 162 is lifted and the distal end 164 of the alignment arm 162 remains in a downstream direction thereby keeping the belt 12 longitudinally aligned at all times.

It should be understood that the switch described in the invention are not limited to plunger switch and could be replaced with other types of switches, such as a proximity switch.

Using the above improved take-up assembly, a method for automatically discontinuing the drive motor on a spiral, continuous conveyor belt made up of a plurality of interconnected links using the improved take-up assembly mounted thereon, comprising detecting excessive movement of said swing arm assembly caused by an obstruction in said conveyor belt that causes said swing arm assembly to move a selected distance and immediately deactivating said drive motor.

In compliance with the statute, the invention described herein has been described in language more or less specific as to structural features. It should be understood, however, that the invention is not limited to the specific features shown, since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

We claim:

1. An improved take-up assembly used with a conveyor belt made up of interconnecting links and driven by at least one drive motor, said take-up assembly comprising:
   a. a take-up assembly mounted over the vertical segment of a continuous conveyor belt made of a plurality of interconnected links, said take-up assembly includes a lower swing arm assembly pivotally connected to said take-up assembly, said swing arm assembly including at least one J-shaped arm disposed over an inside curve segment of said conveyor belt so that when tension of said conveyor belt increases the conveyor belt bends and presses against said J-shaped arm and forces said swing arm assembly outward; and,
   b. an obstruction sensing subsystem coupled to said swing arm assembly and configured to inactivate said drive motor when said swing arm assembly rotates to a pre-determine amount.

2. The improved take-up assembly, as recited in claim 1, wherein said obstruction sensing subsystem includes at least one cam head attached to said J-shaped arm and a switch configured to be activated when cam head is rotated when said J-shaped arm is rotated a sufficient angle, said switch being electrically configured to shut off said drive motor when said J-shaped arm is rotated a sufficient distance.

3. The improved take-up assembly, as recited in claim 2, wherein said switch used with said obstruction sensing subsystem is a plunger switch with a plunger that is moves to an activated or deactivated position when said swing arm is rotated a sufficient predetermined amount.

4. The improved take-up assembly as recited in claim 1, further including a second obstruction sensing subsystem located adjacent to said support arms used to inactivate said drive motor when excessive belt accumulates on or adjacent to said support arms.

5. The improved take-up assembly, as recited in claim 4, wherein said second obstruction sensing subsystem includes an upward extending, diagonally aligned trigger arm aligned over said conveyor belt moving in said take up assembly and a switch configured to be activated with said trigger arm is forced inward a sufficient distance by accumulated conveyor belt links, said switch being electrically configured to shut off said drive motor when said trigger arm is pressed outward by said conveyor belt a predetermined distance.

6. The improved take-up assembly as recited in claim 2, further including a second obstruction sensing subsystem located adjacent to said support arms used to inactivate said drive motor when excessive belt accumulates on or adjacent to said support arms.

7. The improved take-up assembly, as recited in claim 6, wherein said second obstruction sensing subsystem includes an upward extending, diagonally aligned trigger arm aligned over said conveyor belt moving in said take-up assembly, and a switch configured to be activated with said trigger arm is forced inward a sufficient distance by accumulated conveyor belt links, said switch being electrically configured to shut off said drive motor when said trigger arm is pressed outward by said conveyor belt a predetermined distance.

8. The improved take-up assembly, as recited in claim 1, further including an excessive buckling sensing subsystem coupled to said swing arm assembly.

9. The improved take-up assembly, as recited in claim 8, where said buckling sensing subsystem includes an alignment arm extending downstream from said take-up assembly and disposed over said conveyor belt, said alignment arm being pivotally attached to said swing arm assembly so that when excessive buckling occurs in said conveyor belt under said alignment arm, said swing arm assembly is rotated upward and activates said switch and shuts down said drive motor.

10. The improved take-up assembly, as recited in claim 2, further including an excessive buckling sensing subsystem coupled to said swing arm assembly.

11. The improved take-up assembly, as recited in claim 10, where said buckling sensing subsystem includes an alignment arm extending downstream from said take-up assembly and disposed over said conveyor belt, said alignment arm being pivotally attached to said swing arm assembly so that when excessive buckling occurs in said conveyor belt under said alignment arm, said swing arm assembly is rotated upward and activates said switch and shuts down said drive motor.

12. The improved take-up assembly, as recited in claim 4, further including an excessive buckling sensing subsystem coupled to said swing arm assembly.

13. A device for detecting obstructions in a continuous conveyor belt driven by at least one drive motor, comprising;
   a. a swing arm-style take-up assembly mounted on a vertical segment of said conveyor belt and upstream and immediately adjacent to an inside bend, said take-up assembly includes two upward extending diagonally aligned support arms and a lower swing arm assembly that bends around the inside bend of said conveyor belt; and b. a swing arm rotation sensor subsystem electrically coupled to said drive motor, said swing arm rotation sensor subsystem automatic shuts off said drive motor when rotated when the length of said conveyor belt traveling over said bend is shorten thereby forcing said swing arm outward.

14. The improved take-up assembly as recited in claim 13, further including an excessive buckling sensing subsystem coupled to said swing arm assembly.

15. The improved take-up assembly as recited in claim 14, where said buckling sensing subsystem includes an alignment arm extending downstream from said take-up assembly and disposed over said conveyor belt, said alignment are being pivotally attached to said swing arm assembly so that when excessive buckling occurs in said conveyor belt under said alignment arm, said swing arm assembly is rotated upward and activates said switch and shuts down said drive motor.

16. A method for automatically deactivating the drive motor on a spiral, continuous conveyor belt made up of a plurality of interconnected links with a pivoting swing arm style take-up assembly that includes at least one J-shaped arm mounted over a curved segment of said conveyor belt, said method comprising detecting excessive movement of said swing arm assembly caused by an obstruction in said conveyor belt that forces said J-shaped arm to move a predetermined amount and deactivating said drive motor.

17. The method as recited in claim 16, wherein said swing arm style take-up assembly includes a pivotally attached alignment arm that extends downstream and over said conveyor belt, said method for automatically deactivating said drive motor includes the step of detecting excessive buckling of said conveyor belt under said alignment which forces said alignment arm to move a predetermined amount and deactivate said drive motor.

\* \* \* \* \*

UNITED STATES PATENT AND TRADEMARK OFFICE
CERTIFICATE OF CORRECTION

| | |
|---|---|
| PATENT NO. | : 8,857,604 B2 |
| APPLICATION NO. | : 13/437838 |
| DATED | : October 14, 2014 |
| INVENTOR(S) | : Gerald J. Heber |

Page 1 of 1

It is certified that error appears in the above-identified patent and that said Letters Patent is hereby corrected as shown below:

In the claims

Col. 7, line 10 claim 15 should read

15. The improved take-up assembly as recited in Claim 14, where said buckling sensing subsystem includes an alignment arm extending downstream from said take-up assembly and disposed over said conveyor belt, said alignment arm being pivotally attached to said swing arm assembly so that when excessive buckling occurs in said conveyor belt under said alignment arm, said swing arm assembly is rotated upward and activates said switch and shuts down said drive motor.

Signed and Sealed this
Sixth Day of October, 2015

Michelle K. Lee
*Director of the United States Patent and Trademark Office*